United States Patent
Shoshan et al.

(10) Patent No.: US 10,557,917 B2
(45) Date of Patent: Feb. 11, 2020

(54) SYSTEM AND METHODS OF LOCATING WIRELESS DEVICES IN A VOLUME

(71) Applicant: SAVERONE 2014 LTD., Petah-Tikva (IL)

(72) Inventors: Yaakov Shoshan, Ashkelon (IL); Yossef Cohen, Hod Hasharon (IL); Amiram Gur Gerasi, Ganey Tikva (IL); Amir Lavi, Rehovot (IL)

(73) Assignee: SAVERONE 2014 LTD., Petah-Tikva (IL)

( * ) Notice: Subject to any disclaimer, the term of this patent is extended or adjusted under 35 U.S.C. 154(b) by 0 days.

(21) Appl. No.: 16/064,109

(22) PCT Filed: Nov. 28, 2016

(86) PCT No.: PCT/IL2016/051273
§ 371 (c)(1),
(2) Date: Jun. 20, 2018

(87) PCT Pub. No.: WO2017/109769
PCT Pub. Date: Jun. 29, 2017

(65) Prior Publication Data
US 2018/0372834 A1    Dec. 27, 2018

Related U.S. Application Data

(60) Provisional application No. 62/270,324, filed on Dec. 21, 2015.

(51) Int. Cl.
*G01S 5/06* (2006.01)
*G01S 5/02* (2010.01)

(52) U.S. Cl.
CPC ............. *G01S 5/06* (2013.01); *G01S 5/0252* (2013.01); *G01S 5/0273* (2013.01)

(58) Field of Classification Search
CPC ........ H04W 24/06; H04W 4/80; H04W 16/26
(Continued)

(56) References Cited

U.S. PATENT DOCUMENTS

| 7,817,092 B1 * | 10/2010 | Olivieri ..................... G01S 5/14 342/451 |
| 2006/0284769 A1 | 12/2006 | Bolduc |
| 2011/0195699 A1 * | 8/2011 | Tadayon .............. H04B 5/0062 455/418 |

FOREIGN PATENT DOCUMENTS

WO    2015/198306 A1    12/2015

OTHER PUBLICATIONS

Kobayashi, T. (2006). Measurements and characterization of ultra wideband propagation channels in a passenger-car compartment. IEICE transactions on fundamentals of electronics, communications and computer sciences, 89(11), 3089-3094.
(Continued)

*Primary Examiner* — Sam Bhattacharya
(74) *Attorney, Agent, or Firm* — Browdy and Neimark, PLLC

(57) ABSTRACT

A system for localizing a transmitting wireless device within a known volume, the system comprising: antennae deployed in respective locations at least some within the known volume, each of the antennae operative to receive and output a signal from the transmitting device; analog-to-digital converter/s; and a processor receiving digital sampled received signals and computing real time output parameter/s as function of: sampled received signals S, received from the transmitting wireless device at antenna i; and of sampled signals, received from the transmitting wireless device at antenna j and sampled, simultaneously with reception at antenna I and sampling of sampled received signals S, function being independent of power level at which transmitting device is transmitting, and to estimate transmitting
(Continued)

wireless device's location within volume by comparing the parameter/s to reference output parameters respectively having known correspondence to known possible locations/s within volume, for at least 2 of the antennae.

23 Claims, 12 Drawing Sheets

(58) Field of Classification Search
USPC .................................. 455/456.1, 562.1, 571
See application file for complete search history.

(56) References Cited

OTHER PUBLICATIONS

Balachander, D., Rao, T. R., & Tiwari, N. (Apr. 2013). In-vehicle RF propagation measurements for Wireless Sensor Networks at 433/868/915/2400MHz. In 2013.

* cited by examiner

Figure 1 a. Providing N >= 2 antennae deployed in N >= 2 respective locations at least some of which are located within the known volume, each of the antennae being operative to receive and output a signal from the transmitting wireless device and at least one analog-to-digital converter operative to convert analog received signals at the output of the antennae to digital sampled received signals

b. for at least one pair of antennae i, j from among said N antennae:

c. Using a processor to receive said digital sampled received signals and to compute at least one real time output parameter comprising a predetermined function of:
digitally sampled received signals S, received from the transmitting wireless device at antenna i; and of digitally sampled signals, received from the transmitting wireless device at antenna j and digitally sampled, simultaneously with reception at antenna I and digital sampling of said digitally sampled received signals S,
which predetermined function is independent of a power level at which the transmitting device is transmitting

d. Using a processor to estimate the transmitting wireless device's location within the volume by comparing said at least one real time output parameter to plural reference output parameters respectively having a known correspondence to plural known possible locations within said volume respectively

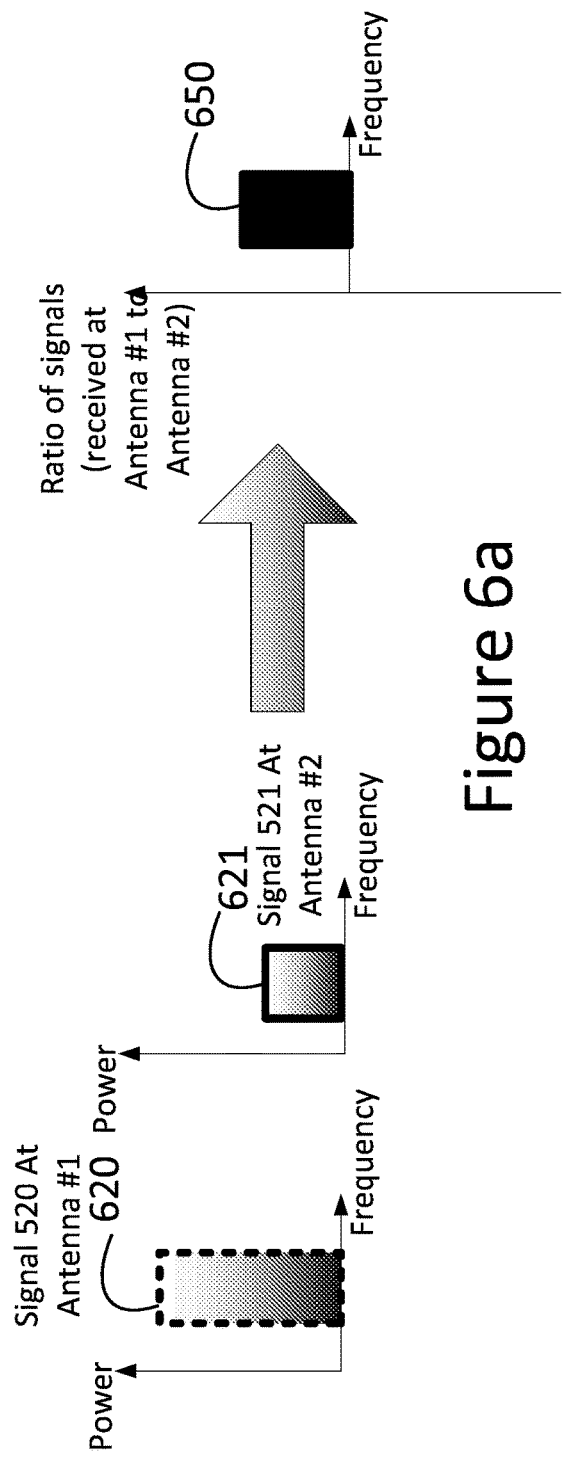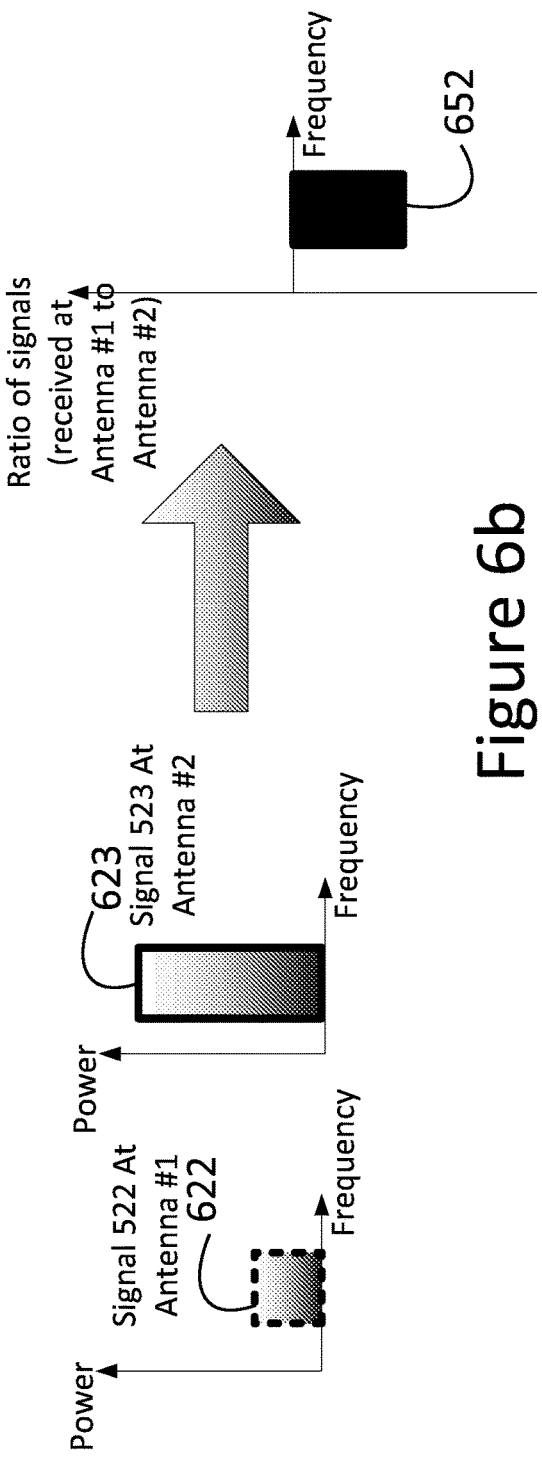
Figure 6a
Figure 6b

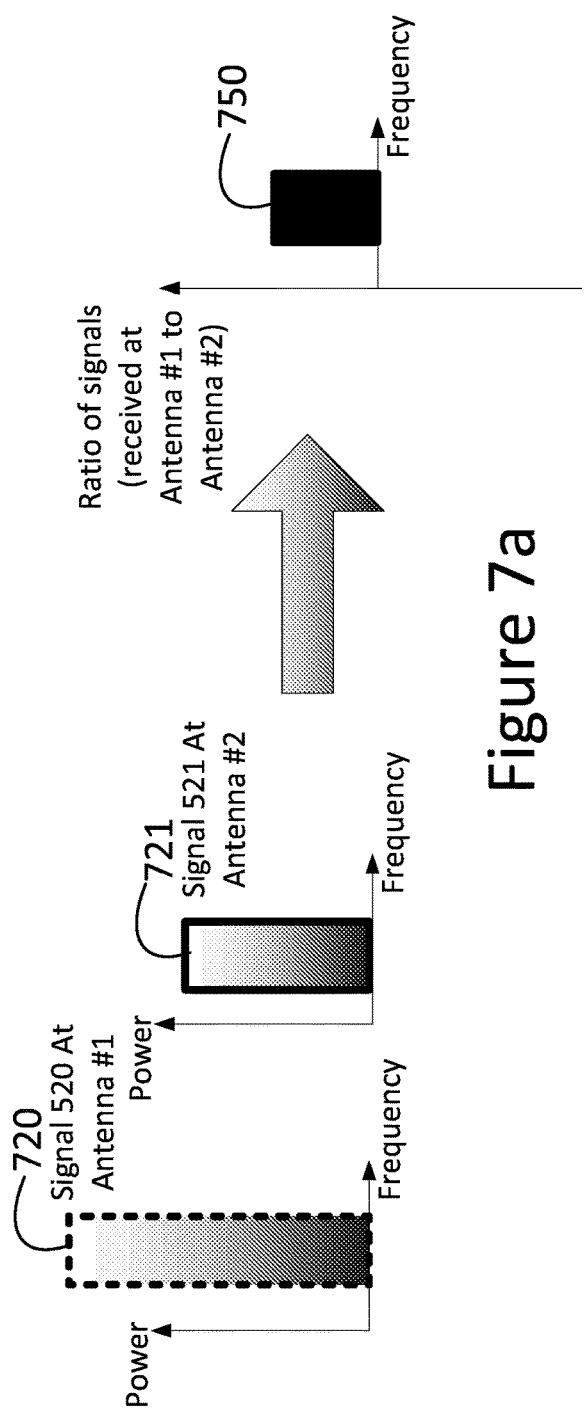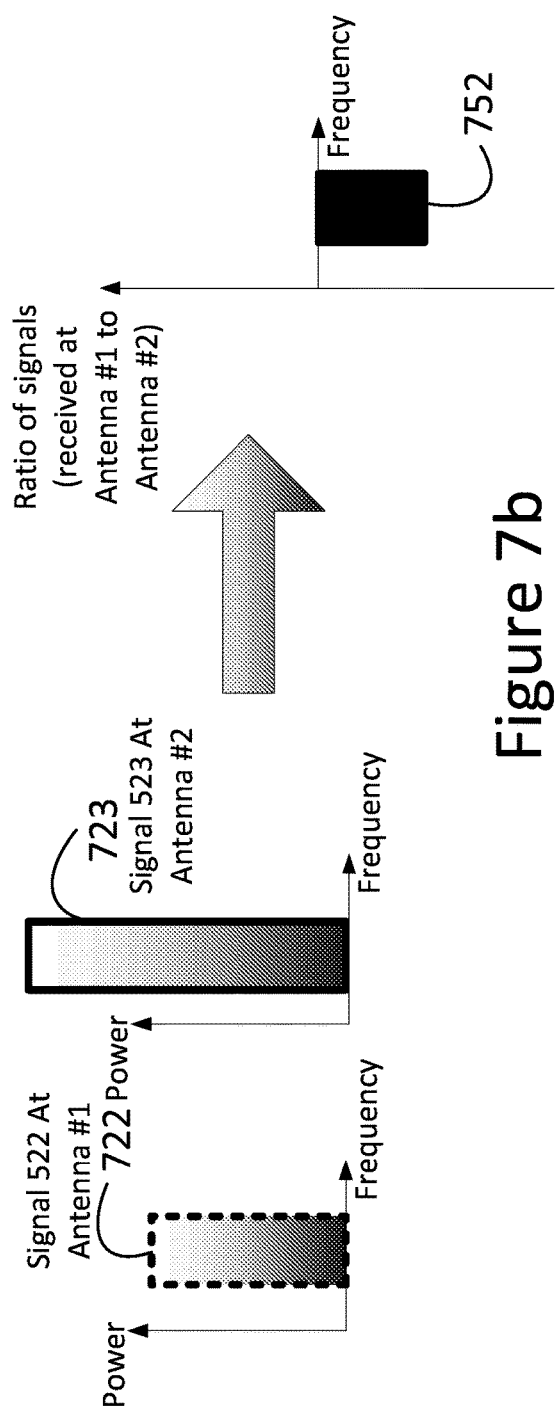

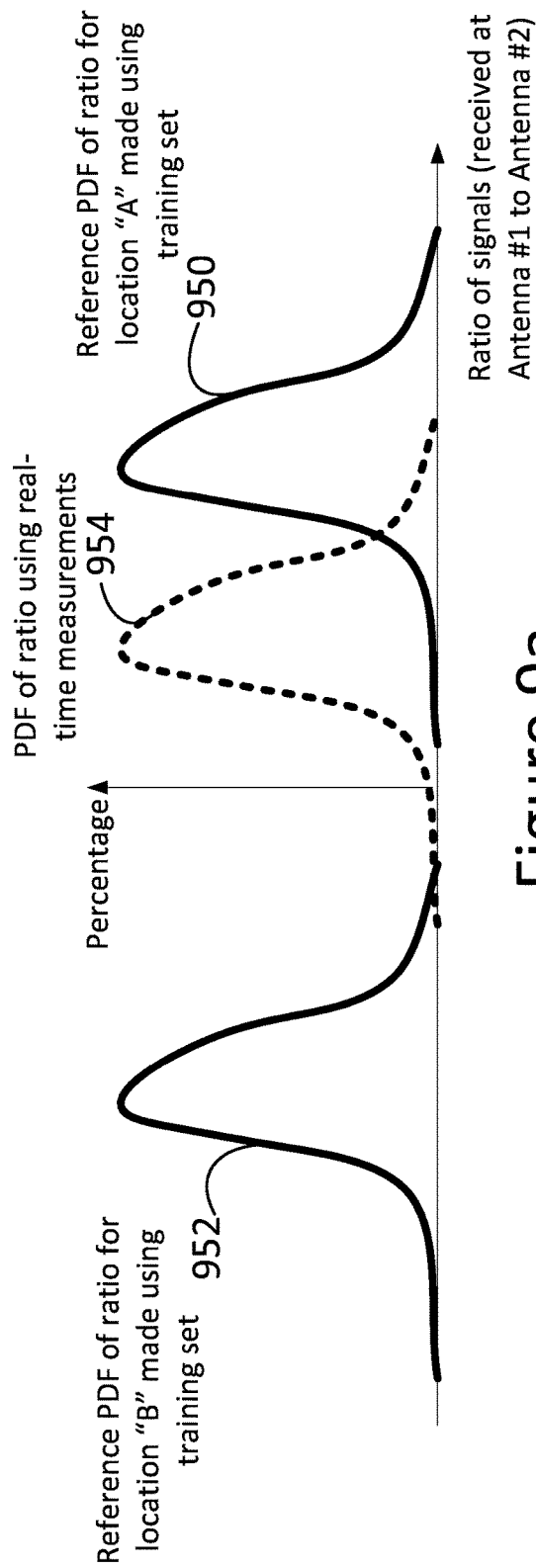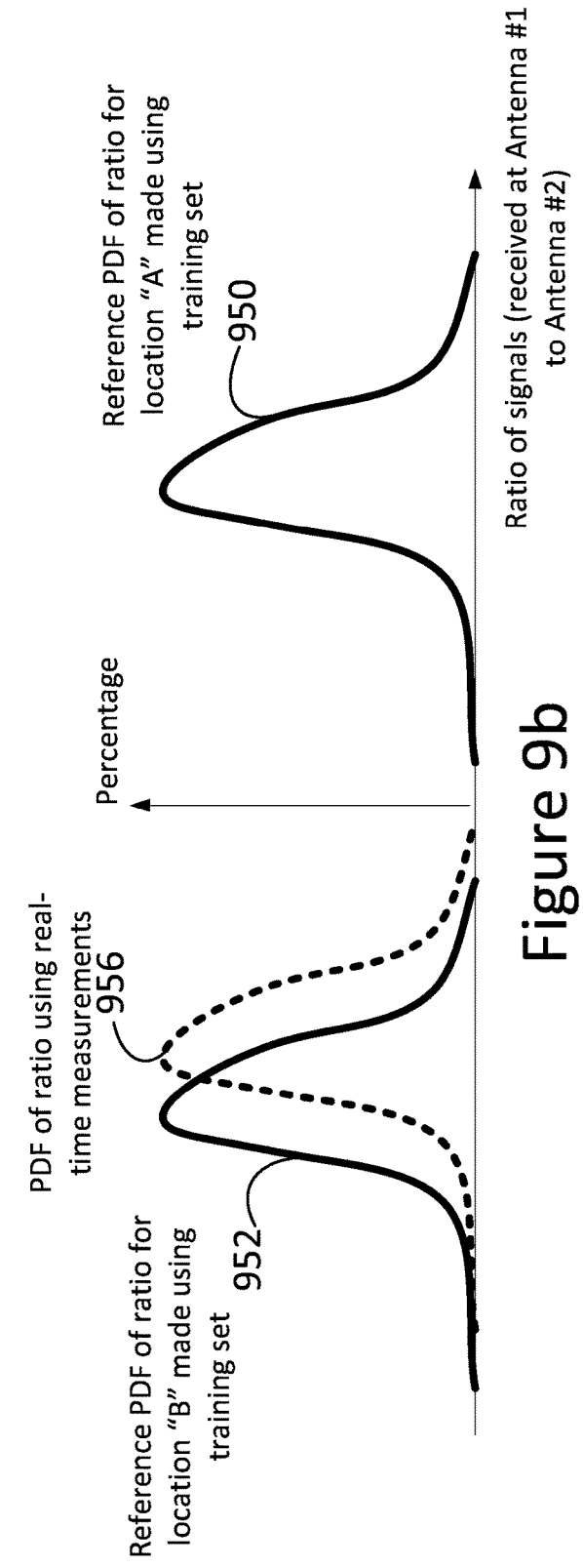

SYSTEM AND METHODS OF LOCATING WIRELESS DEVICES IN A VOLUME

REFERENCE TO CO-PENDING APPLICATIONS

The disclosure of PCT/IL2015/050630, entitled "System and Methods to Facilitate Safe Driving" filed 22 Jun. 2015 and published as WO 2015198306, and of the publications and patent documents cited therein directly or indirectly, are hereby incorporated by reference.

Priority is claimed from U.S. Provisional Patent Application No. 62/270,324, entitled "System and methods of locating wireless devices in a volume" and filed on Dec. 21, 2015, the disclosure of which application/s is hereby incorporated by reference.

FIELD OF THIS DISCLOSURE

The present invention relates generally to transmitting devices and more particular to systems for localizing transmitting devices.

BACKGROUND FOR THIS DISCLOSURE

Systems for localizing transmitting devices are known. For example, wireless Localization Based on RSSI (received Signal Strength Indication) Fingerprints is known. Generally, if the RSSI is high vs. low, relative to a known power level of a transmission, this would suggest that the transmitting element and receiver are closer together vs. further apart. Therefore, if the location of the receiver is known, the location of the transmitting element may be deduced using the RSSI of the transmission as received, and the known power level of the transmission when it was transmitted.

Existing vehicle technologies include:

Measurements and Characterization of Ultra Wideband Propagation Channels in a Passenger-Car Compartment—Takehiko Kobayashi Wireless Systems Laboratory Tokyo Denki University 2-2 Kanda-nishiki-cho, Chiyoda-ku, Tokyo, 101-8457 Japan: and In-vehicle RF propagation measurements for Wireless Sensor Networks at 433/868/915/2400 MHz conference paper January 2013.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide a system to locate a wireless device in a volume.

Certain embodiments seek to provide calibration methods for calibrating such systems. Calibration may employ a default configuration, and/or manual calibration may occur per vehicle and an automatic method may optionally be used to update the calibration parameters.

Certain embodiments seek to provide localization inside a predefined volume (such as a room, a vehicle, a cabin, a train).

Certain embodiments seek to provide localization inside a volume inhabited by moving objects such as persons who come and go, or remain at one position but move their limbs.

Certain embodiments seek to provide a system and methods to locate (aka localize) modern wireless devices when power control is enabled.

Certain embodiments seek to provide a method, using information in the control channel to determine the exact transmission power of a device.

Certain embodiments seek to provide a method to locate a wireless device that supports power control without using power information in the control channel e.g. to determine the exact transmission power of a device.

Certain embodiments seek to provide reference antenna which provides indications of when and how transmission power is changing.

Certain embodiments seek to provide a localization system for locating a wireless device e.g. cellphone with power control enabled in a vehicle, without using any information from the control channel.

There is thus provided, in accordance with at least one embodiment of the present invention, the present invention typically includes at least the following embodiments:

Embodiment 1

A system for localizing a transmitting wireless device within a known volume, the system comprising:

$N \geq 2$ antennae deployed in $N \geq 2$ respective locations at least some of which are located within the known volume, each of the antennae being operative to receive and output a signal from the transmitting wireless device;

At least one analog-to-digital converter operative to convert analog received signals at the output of the antennae to digital sampled received signals; and a processor operative:

to receive the digital sampled received signals and to compute at least one real time output parameter comprising a predetermined function of:

digitally sampled received signals S, received from the transmitting wireless device at antenna i; and of digitally sampled signals, received from the transmitting wireless device at antenna j and digitally sampled, simultaneously with reception at antenna I and digital sampling of the digitally sampled received signals S, which predetermined function is independent of a power level at which the transmitting device is transmitting, and to estimate the transmitting wireless device's location within the volume by comparing the at least one real time output parameter to plural reference output parameters respectively having a known correspondence to plural known possible locations within the volume respectively, for at least one pair of antennae i, j from among the N antennae.

Embodiment 2

A system according to any of the preceding embodiments wherein the function comprises a ratio between:

quality of reception of transmission from the transmitting wireless device at antenna i; and simultaneous quality of reception of transmission from the transmitting wireless device at antenna j.

Embodiment 3

A system according to any of the preceding embodiments wherein the function comprises a probability density function of a ratio between:

quality of reception of transmission from the transmitting wireless device at antenna I; and simultaneous quality of reception of transmission from the transmitting wireless device at antenna j.

Embodiment 4

A system according to any of the preceding embodiments wherein the quality of reception comprises a power level measurement.

Embodiment 5

A system according to any of the preceding embodiments wherein the power level measurement comprises an RSSI value.

Embodiment 6

A system according to any of the preceding embodiments wherein the transmitting wireless device comprises a cellular device transmitting to a base station other than the N antennae.

Embodiment 7

A system according to any of the preceding embodiments wherein the known volume is within a vehicle and the antennae are deployed on board the vehicle.

Embodiment 8

A system according to any of the preceding embodiments wherein the vehicle has an interior defining 4 corners and the antennae are deployed at least at the 4 corners.

Embodiment 9

A system according to any of the preceding embodiments wherein the vehicle has an interior defining 4 corners and the antennae are deployed at least at some of 4 corners.

Embodiment 10

A system according to any of the preceding embodiments wherein the transmitting device is transmitting to a stationary base station external to the vehicle which is moving.

Embodiment 1

A system according to any of the preceding embodiments wherein the plural reference outputs are each previously learned by computing an output being the predetermined function of:

quality of reception of radiation at antenna i, from a transmitting device deployed at a known location within the volume; and of simultaneous quality of reception of radiation from the transmitting device at antenna j from the transmitting device deployed at the known location.

Embodiment 12

A system according to any of the preceding embodiments wherein the location is estimated by finding plural weights which minimize distance between:

weighted combinations, based on the weights, of the plural reference outputs, and between the real time output, and computing a location which is a weighted combination of the plural locations, using the plural weights which minimize distance.

Embodiment 13

A system according to any of the preceding embodiments wherein the probability density function comprises a probability density function over time.

Embodiment 14

A system according to any of the preceding embodiments wherein the probability density function comprises a probability density function over frequency.

Embodiment 15

A system according to any of the preceding embodiments wherein the comparing comprises computing plural distances between the at least one real time output and each of the plural reference outputs respectively.

Embodiment 16

A system according to any of the preceding embodiments wherein at least one of the distances is computed using least squares technology.

Embodiment 17

A system according to any of the preceding embodiments wherein at least one of the distances is computed by integrating a maximum function of the outputs.

Embodiment 18

A system according to any of the preceding embodiments wherein the at least one pair of antennae comprises multiple pairs.

Embodiment 19

A system according to any of the preceding embodiments wherein the transmitting device is to be localized within a sub-region inside the volume, and wherein the antennae includes at least first and second antennae ("main antennae") deployed within the sub-region and at least one ("reference") antenna deployed externally to the sub-region and wherein the multiple pairs of antennae each include one of the antennae within the sub-region and one of the antennae deployed externally to the sub-region.

Any suitable criteria may be used for deploying the antennae. For example, if a transmitting device is to be localized within a sub-region inside the volume, the antennae may be distributed throughout the volume, or may be distributed mostly within the sub-region apart from one or a few "reference antennae". Alternatively or in addition, antennae may be distributed at locations at which the transmitting device is likely to be present e.g. adjacent to a fixed cradle configured to receive the transmitting device. Any suitable number of antennae may be employed, such as 3-7 antennae within the driver's quadrant and 1 or more antennae outside that quadrant. For example, 2 antenna may be deployed adjacent the driver's and passenger's out-facing legs respectively, a third antenna may be deployed intermediate the first 2 i.e. adjacent the driver's and passenger's in-facing legs, and a fourth antenna may be deployed adjacent the driver's head i.e. to the rear of the first antenna. It is appreciated that all of these antennae other than the third may be mounted on the car interior's inner side walls.

More generally, typically some locations are within a subregion of interest such as a driver's seat or quadrant, and others of the location are external to the subregion, so as to sample both subregion and its exterior, during training. For example, if 13 locations are employed, 7 may be within the subregion and 6 externally thereto.

Embodiment 20

A system according to any of the preceding embodiments wherein the known volume is within a vehicle and the sub-region comprises a quadrant of the vehicle including the driver's seat.

Each antenna may have a reception range of approximately 20-30 cm.

Embodiment 21

A system according to any of the preceding embodiments wherein the system also comprises a computerized service provider configured to selectably provide at least one service unsuitable for an end-user who is driving, depending on whether or not the transmitting device is located within the quadrant of the vehicle including the driver's seat.

Embodiment 22

A system according to any of the preceding embodiments wherein the function comprises a multi-dimensional probability density function of multiple functions each of the multiple functions relating
  quality of reception of radiation from the transmitting device at antenna i; to
  simultaneous quality of reception of radiation from the transmitting device at antenna j.
for a different pair from among the multiple pairs (i, j) respectively.

For example, if 3 main antennae a, b, c are deployed in the driver's quadrant (the portion of the vehicle's interior which is allocated to the driver as opposed to the quadrants allocated to passengers) and 1 reference antenna r is deployed externally to the driver's quadrant, a 3-dimensional PDF may be employed representing probability distribution over 3 ratios, e.g.
  quality of reception of radiation from the transmitting device at antenna a/simultaneous quality of reception of radiation from the transmitting device at antenna r;
  quality of reception of radiation from the transmitting device at antenna b/simultaneous quality of reception of radiation from the transmitting device at antenna r;
  quality of reception of radiation from the transmitting device at antenna c/simultaneous quality of reception of radiation from the transmitting device at antenna r;

Embodiment 23

A method for localizing a transmitting wireless device within a known volume, the method comprising:

Providing N>=2 antennae deployed in N>=2 respective locations at least some of which are located within the known volume, each of the antennae being operative to receive and output a signal from the transmitting wireless device and at least one analog-to-digital converter operative to convert analog received signals at the output of the antennae to digital sampled received signals; and
  Using a processor to receive the digital sampled received signals and to compute at least one real time output parameter comprising a predetermined function of:
    digitally sampled received signals S, received from the transmitting wireless device at antenna i: and of
    digitally sampled signals, received from the transmitting wireless device at antenna j and digitally sampled, simultaneously with reception at antenna I and digital sampling of the digitally sampled received signals S,
    which predetermined function is independent of a power level at which the transmitting device is transmitting,
    and to estimate the transmitting wireless device's location within the volume by comparing the at least one real time output parameter to plural reference output parameters respectively having a known correspondence to plural known possible locations within the volume respectively,
  for at least one pair of antennae i, j from among the N antennae.

Embodiment 24

A computer program product, comprising a non-transitory tangible computer readable medium having computer readable program code embodied therein, the computer readable program code adapted to be executed to implement a method for localizing a transmitting wireless device within a known volume, the method being practiced in conjunction with N>=2 antennae deployed in N>=2 respective locations at least some of which are located within the known volume, each of the antennae being operative to receive and output a signal from the transmitting wireless device and with at least one analog-to-digital converter operative to convert analog received signals at the output of the antennae to digital sampled received signals, the method comprising:
  Using a processor to receive the digital sampled received signals and to compute at least one real time output parameter comprising a predetermined function of:
    digitally sampled received signals S, received from the transmitting wireless device at antenna i: and of
    digitally sampled signals, received from the transmitting wireless device at antenna j and digitally sampled, simultaneously with reception at antenna I and digital sampling of the digitally sampled received signals S,
    which predetermined function is independent of a power level at which the transmitting device is transmitting,
  Using a processor to estimate the transmitting wireless device's location within the volume by comparing the at least one real time output parameter to plural reference output parameters respectively having a known correspondence to plural known possible locations within the volume respectively.
  for at least one pair of antennae i, j from among the N antennae.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display (e.g. on a computer screen or other computer output device), store, and accept information such as information used by or generated by any of the methods and apparatus shown and described herein: the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying: machine-readable memory such as optical disks, CDROMs, DVDs, BluRays, magnetic-optical discs or other discs; RAMs, ROMs. EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein e.g. by providing one or more modules in the processor/s to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 1 is a simplified flow of a method for localizing a transmitting wireless device within a known volume, according to certain embodiments.

FIGS. 6a and 6b illustrate power levels (e.g. RSSI) of signals received at each of the antennae of FIGS. 4 and 5 respectively, e.g. for a specific wireless device which is relatively close to its serving base-station, in accordance with certain embodiments.

FIGS. 7a and 7b illustrate power levels of received signals in antennae for FIGS. 4 and 5, e.g. for a specific wireless device which is far (relative to FIGS. 6a, 6b) from the specific wireless devices' serving base-station, in accordance with certain embodiments.

FIGS. 9a and 9b illustrate examples of real time activation of the locating method for two receiving antennae, in accordance with certain embodiments.

Figure 2:
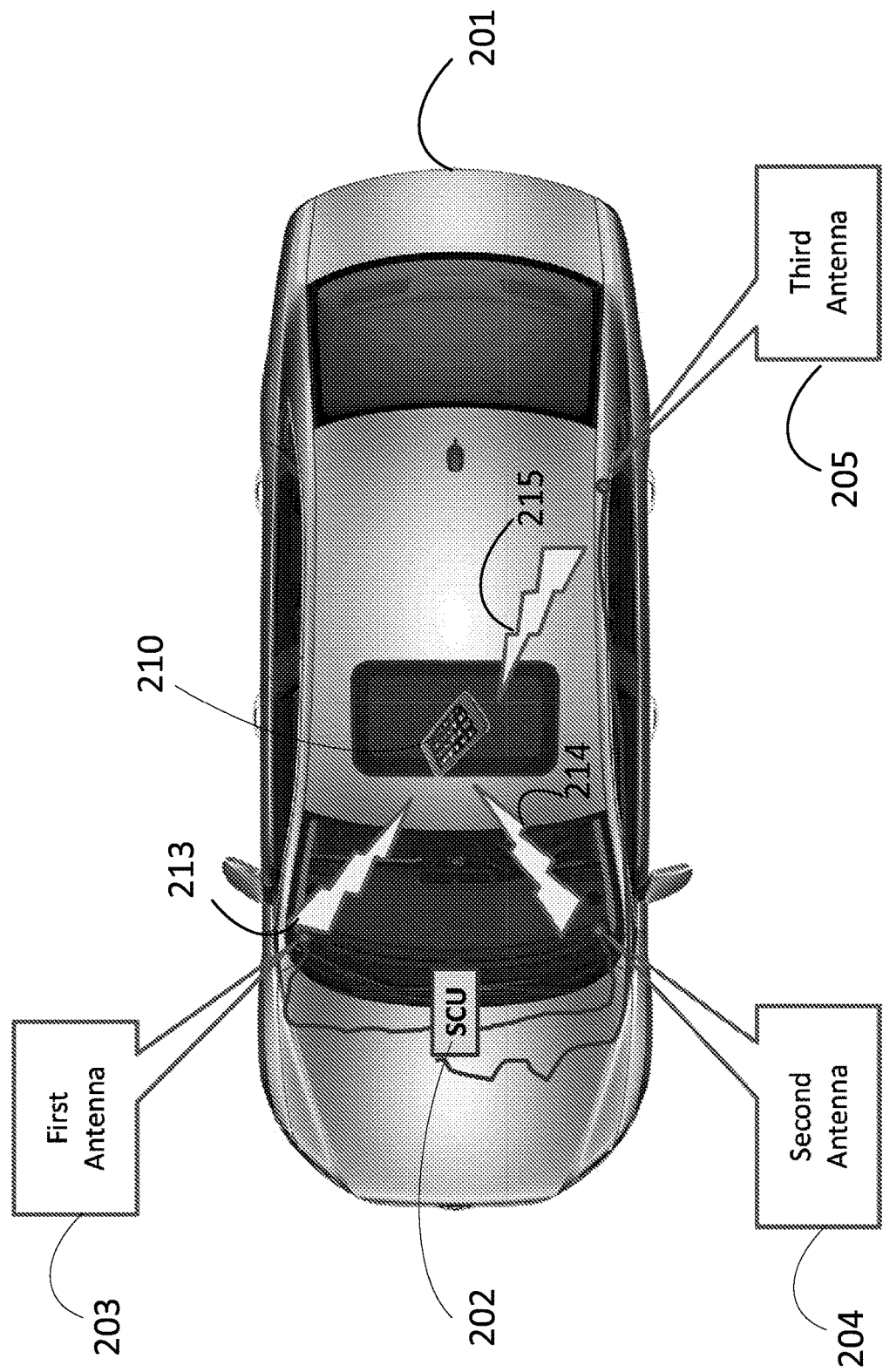
FIG. 2 illustrates example positions of antennae in a vehicle, within which a transmitting device is to be localized, in accordance with certain embodiments.

Methods and systems included in the scope of the present invention may include some (e.g. any suitable subset) or all of the functional blocks shown in the specifically illustrated implementations by way of example, in any suitable order e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Certain embodiments of the present invention seek to provide a system and methods to locate a wireless device in a volume, e.g. a room or (as in the illustrated embodiments) an interior of a vehicle.

The environment inside a vehicle is often characterized by reflections from metal, glass, plastics and other dielectric materials.

FIG. 1 is a simplified flow of a method for localizing a transmitting wireless device within a known volume, according to certain embodiments. The flow of FIG. 1 may be suitably combined with some or all of the elements illustrated in any of the drawings from FIG. 2 onward.

Regarding the method of FIG. 1, localization (estimating location) may for example include determining whether or not the transmitting device is within a specific location inside the volume, such as the device's cradle, if the cradle is fixedly deployed within the known volume.

Each of the antennae may be operative to receive at least one analog signal from the transmitting wireless device which may be converted, by at least one analog-to-digital converter, to digital sampled received signals.

According to certain embodiments, a system for localizing a radiating device within a known volume is provided, the system comprising: N>=2 antennae deployed in N>=2 respective locations of which at least some are within the known volume, each of the antennae being operative to output its quality of reception of signals radiation from the radiating device; and a processor operative to receive said quality of reception from said antennae and to compute at least one real time output comprising a predetermined function of:

quality of reception of radiation from the radiating device at antenna i; and of simultaneous quality of reception of radiation from the radiating device at antenna j, for at least one pair of antennae i, j from among said N antennae, which predetermined function is independent of a power level at which the radiating device is radiating, and to estimate the radiating device's location within the volume by comparing said at least one real time output to plural reference outputs respectively having a known correspondence to plural known possible locations within said volume respectively.

According to certain embodiments, a system for localizing a radiating device within a volume is provided, the system comprising:

N>=2 antennae deployed in N>=2 respective locations of which some or all are within the known volume, each of the antennae being operative to output its received signal from the radiating/transmitting wireless device; and analog-todigital converter/s operative to convert the analog received signals at the output of the antennae to digital sampled received signals, and a processor operative to receive said digital sampled received signals and to compute at least one real time output parameter comprising a predetermined function of:
    digital sampled received signals from the radiating/transmitting wireless device at antenna i; and of
    simultaneous digital sampled received signals from the radiating/transmitting wireless device at antenna j,
    which predetermined function is independent of a power level at which the radiating/transmitting device is radiating/transmitting,
        and to estimate the radiating/transmitting wireless device's location within the volume by comparing said at least one real time output parameter to plural reference outputs parameters respectively having a known correspondence to plural known possible locations within said volume respectively,
for at least one pair of antennae i, j from among said N antennae.

It is appreciated that true simultaneity is a theoretical concept hence practically speaking, an insignificant time interval, say of 10 or 20 or a few dozen millisec, may unavoidably elapse between digital sampling of signals, received from the transmitting wireless device at antenna j and digitally sampled, on the one hand, and reception at antenna I and digital sampling of the digitally sampled received signals S, on the other hand; this has little adverse practical significance however, e.g. since the extent of motion of the cellular device over such a short time period is negligible relative to other relevant quantities in the total situation. Also, PDFs may be integrated over much longer time periods e.g. over hundreds of milliseconds or seconds.

It is appreciated that true simultaneity is a theoretical concept hence practically speaking, an insignificant time interval, say of nanoseconds, microseconds or even 10 or 20 or a few dozen millisec, may unavoidably elapse between digital sampling of signals, received from the transmitting wireless device at antenna j and digitally sampled, on the one hand, and reception at antenna i and digital sampling of the digitally sampled received signals S, on the other hand. This typically has little adverse practical significance however, e.g. since the extent of motion of the cellular device by the user over such a short time period is negligible relative to other relevant quantities in the total situation. Also, PDFs may be integrated over much longer time periods e.g. over hundreds of milliseconds or seconds.

FIG. 2 is a pictorial illustration of an example location system configuration. It is sought to determine a location within a vehicle 201, of wireless device [210] (e.g. cellular phone/smartphone, tablet, modem, etc.) that uses a communication protocol (e.g. cellular 2G/3G/4G/5G. WiMAX, WiFi, Bluetooth, Near-Field-Communication). A system control unit (SCU) [202] is connected to plural antennae e.g. [203] [204] [205]. Each of the antennae receive a signal [213] [214] [215] respectively, transmitted from wireless device [210].

Figure 3:
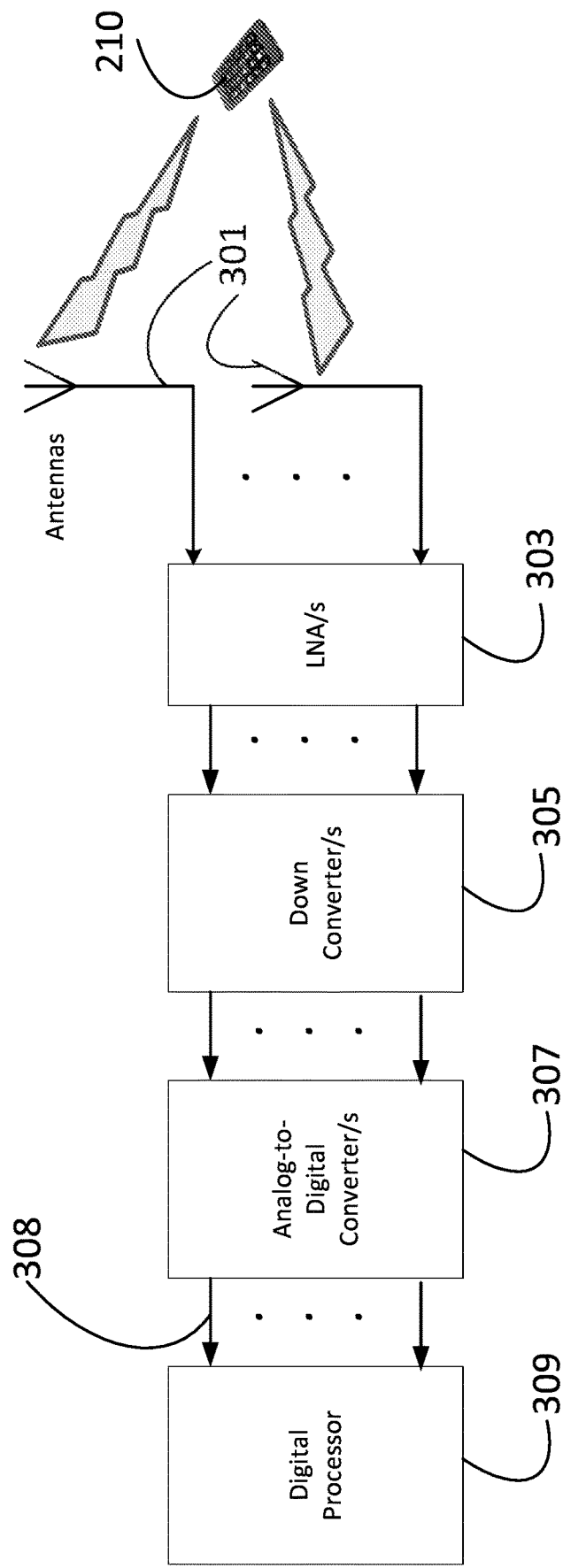
FIG. 3 illustrates a cellphone localization system provided in accordance with an embodiment of the present invention.

FIG. 3 illustrates a cellphone localization system provided in accordance with an embodiment of the present invention. Generally, main antenna/e and reference antenna/c may be employed for receiving RF signals from a wireless device. Low Noise Amplifiers may be provided to amplify weak RF signals without adding too much noise. An A/D (Analog to Digital converter) may be provided to convert the analog RF signal collected by the antenna/c into digital data for analysis by a DSP (Digital Signal Processing) chip that is used to analyze the RF signals. The DSP is configured to find the position of the wireless device in the vehicle; e.g. using any suitable localization algorithm. It is appreciated that each illustrated element may in fact comprise plural such elements.

The Antennae [301] are typically first to receive signals transmitted from the wireless device [210]. If Low-Noise Amplifier/s (LNA) [303] are provided, these amplify the received signal with the addition of minimal noise. If a Down-Converters Layer [305] is provided, it converts the RF signal to IF (Intermediate Frequency) or to a base-band signal. ADCs (Analog-to-Digital Converter/s) [307] are operative to convert the analog signal to digital samples. Digital signals [308] originally received by each particular antenna, may then be processed by the Digital Processor [309].

Figure 4:
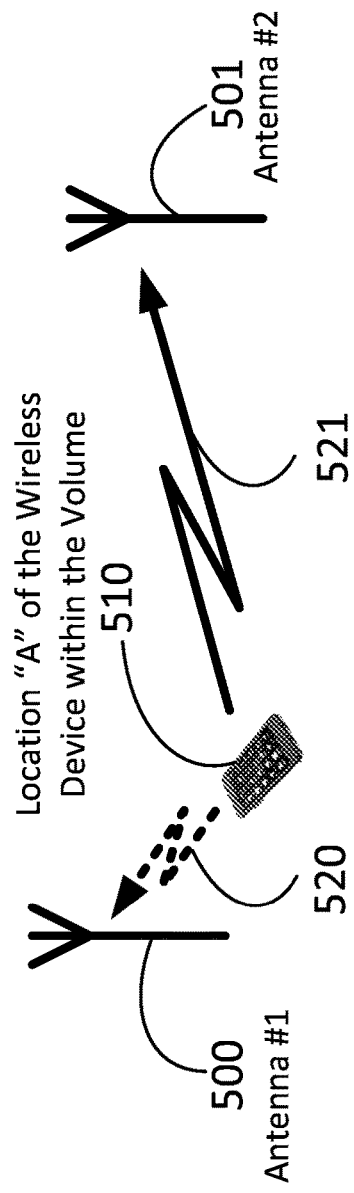
FIGS. 4 and 5 illustrate two respective locations A and B of the wireless device within a volume e.g. vehicle interior or room, in accordance with certain embodiments.
Figure 5:
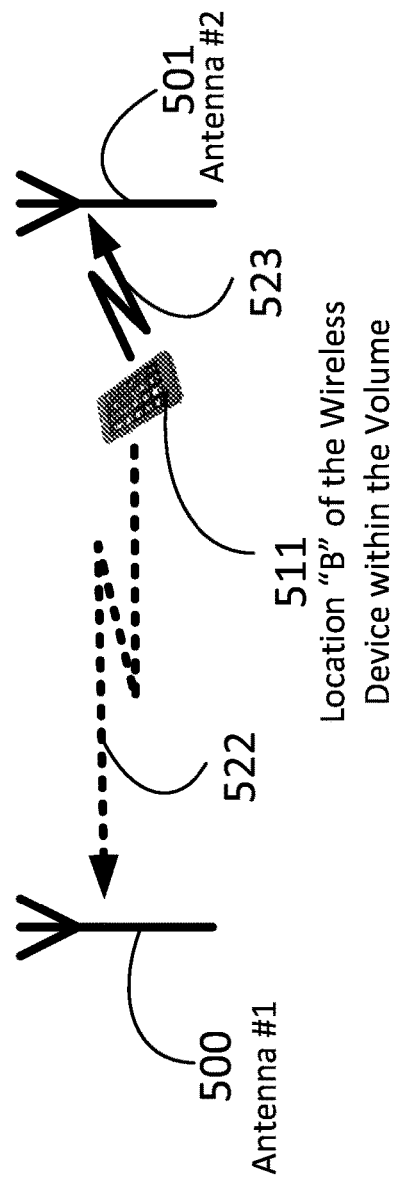

In FIGS. 4 and 5 two respective locations "A" and "B" of the wireless device within a volume e.g. vehicle interior or room are shown. Two reception antennae #1 [500] and #2 [501] are shown by way of example although more than 2 such antennae may be provided.

In FIG. 4 the wireless device [510] is at location "A" which is closer to Antenna #1 [500] than to Antenna 2. Each of the antennae receives the transmitted signal. Antenna #1 [500] receives signal [520] travelling through the wireless channel between wireless device [510] and Antenna #1 [500]. Antenna #2 [501] receives signal [521] travelling through the wireless channel between wireless device [510] and Antenna #1 [500].

In FIG. 5 the wireless device [511] is located in location "B" which is closer to Antenna #2 [501] than to Antenna 1. Here too each of the antennae receives the transmitted signal. Antenna #1 [500] receives signal [522] travelling through the wireless channel between the wireless device [511] and Antenna #1 [500], and Antenna #2 [501] receive the signal [523] travelling through the wireless channel between wireless device [511] and Antenna #1 [500].

In FIGS. 6a and 6b power levels (e.g. RSS/RSSI) of signals received at each of the antennae are shown for FIGS. 4 and 5 respectively, for a specific wireless device that transmits relatively low power which is e.g. relatively close to its serving base-station (or e.g. to another wireless device which needs to receive the specific wireless device's transmission), or e.g. for a relative low data rate of transmission that needs to be sent to to the receiver of the transmitting wireless device from the wireless device.

In FIG. 6a the power of Received signal [520] in FIG. 4 is [620] whereas the power of Received signal [521] in FIG. 4 is [621]. Because mobile device [510] in FIG. 4 is closer to antenna #1 than to antenna 2, the power [620] received at antenna#1 is higher than the power [621] received in antenna#2. So Ratio [650] in linear scale (which is minus in decibels) between the power received in antenna #1 [620] and the power received in antenna #2 [621] is positive because the nominator [620] is bigger than the denominator [621] i.e. the power received in antenna #1 [620] is larger than (exceeds) the power received in antenna #2 [621]. The ratio may be assumed to be e.g. an average of values varying over time and/or frequency.

In FIG. 6b the power of Received signal [522] in FIG. 5 is [622], whereas the power of Received signal [523] in FIG. 5 is [623]. Since the mobile device [511] in FIG. 5 is closer to antenna #2 than to antenna 1, the power [622] received in antenna#1 is lower than the power [623] received in antenna#2. Ratio [652] (minus in decibels) between the power [622] received in antenna #1 and the power [623]

received in antenna #2, is negative because the nominator [620] is smaller than the denominator [621] i.e. the power [622] received in antenna #1 is less than the power received in antenna #2.

In FIGS. 7a and 7b the power levels (e.g. RSS/RSSI) of the received signals in each of the antennae are again shown for FIGS. 4 and 5, this time for a specific wireless device that transmits relatively high power which is e.g. far (relative to FIGS. 6a, 6b) from the specific wireless device's serving base-station (or e.g. from another wireless device which needs to receive the specific wireless device's transmission) or e.g. for a relative high data rate of transmission that needs to be sent to the receiver of the transmitting wireless device from the wireless device. A power control mechanism may be enabled for the wireless system (or wireless protocol) of the wireless device and hence, in FIGS. 7a and 7b the wireless device may transmit using a higher output power relative to the wireless device in FIGS. 6a, 6b. Similarly, in FIGS. 6a and 6b the wireless device may transmit using a lower output power relative to the wireless device in FIGS. 7a, 7b.

In FIG. 7a the power of Received signal [520] of FIG. 4 is [720], whereas the power of Received signal [521] in FIG. 4 is [721]. Because the mobile device [510] in FIG. 4 is closer to antenna #1 than to antenna 2, the power [720] received at antenna#1 is higher than the power received at antenna#2 [721]. Ratio [750] (minus in decibels) between the power [720] received at antenna #1 and the power [721] received at antenna #2 is positive because the nominator [720] is bigger than the denominator [721].

In FIG. 7b the power of Received signal [522] in FIG. 5 is [722], whereas the power of Received signal [523] in FIG. 5 is [723]. Because mobile device [511] in FIG. 5 is closer to antenna #2 than to antenna 1, the power [722] received in antenna#1 is lower than the power [723] received in antenna#2. Ratio [752] (minus in decibels) between the power [722] received in antenna #1 and the power [723] received in antenna #2 is negative because the nominator [720] is smaller than the denominator [721].

It is appreciated that the magnitude of the ratio [650] in FIG. 6a is similar to the magnitude of the ratio [750] of FIG. 7a. More generally, even though the wireless device transmits at different power levels e.g. in view of its varying distance from the base-station (or from its receiving wireless device) or may transmit different data-rates; nonetheless the magnitude of the ratio remains similar yielding robust location capability of the wireless device irrespective of the current transmitted power level (that is for example related the geographical location of the wireless device with respect to its serving base-station or its receiving wireless device, or its data-rate). Similarly, the magnitude of the ratio [652] in FIG. 6b is similar to the magnitude of the ratio [752] of FIG. 7b, although the specific wireless device transmits at different power levels, as the specific device's distance from the base-station (or its receiving wireless device) varies, or the specific device may transmit at different data-rates. The distance between the ratio parameters for locations "A" and location "B" is large and in this example using the sign (positive or negative) of the power ratio may provide an indication of the location of the wireless device between/relative to (e.g. known) locations "A" and "B".

Figure 8A:
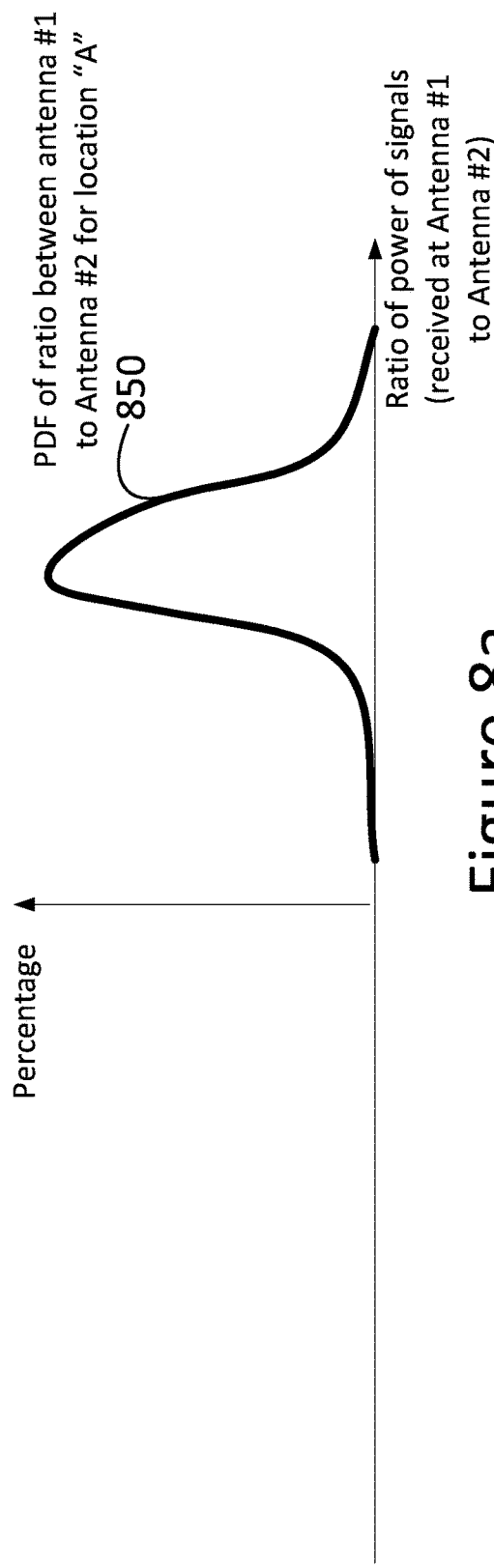
FIGS. 8a-8b illustrate typical statistical variation of the power ratios ([650], [652], [750], [752] of FIGS. 6a, 6b, 7a, 7b, in accordance with certain embodiments.
Figure 8B:
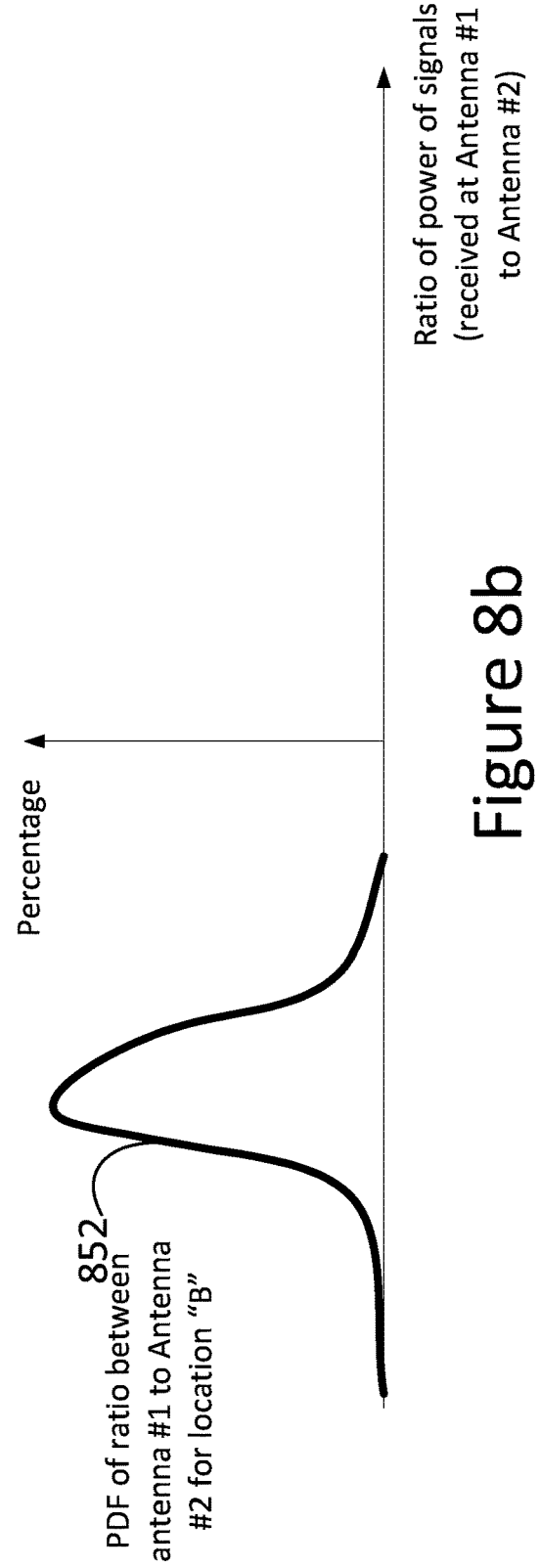

FIGS. 8a-8b illustrate typical statistical variation of the power ratios ([650], [652], [750], [752] of FIGS. 6a, 6b, 7a. 7b. To overcome wireless effects that may degrade the ability to correctly determine the location of the wireless device based on the power ratio between the antennae, a vector of power ratios collected during a typical period of time (e.g. dozens or hundreds of milliseconds or even several seconds or more) may be stored. Thereafter, from the stored vector of power ratios a PDF (Probability Density Function) of these ratios (i.e. treating the ratio as a variable) may be computed. In FIG. 8a the PDF for a wireless device close to Antenna #1 is shown. The PDF graph [850] represents a distribution of power ratios [650] or [750] of FIG. 6a or 7a respectively. In FIG. 8b, the PDF graph [852] represents a distribution of power ratios [652] or [752] of FIG. 6b or 7b respectively.

FIGS. 9a and 9b illustrate examples of real time activation of the locating method for two receiving antennae e.g. the antennae of FIGS. 4 and 5 e.g. using the method of FIG. 10c described in detail below. In FIGS. 9a and 9b, reference PDFs [950] and [952] correspond to locations "A" and "B" respectively. These reference PDFs may be generated e.g. as described in FIG. 10a, operations [1001] and [1002] and may be stored in a reference PDFs bank [1003] (and similarly in reference PDFs banks [1013] and [1023] in FIGS. 10b and 10c respectively). Real-time PDFs [954] in FIG. 9a and [956] in FIG. 9b may be generated e.g. by operation [1025] in FIG. 10c. FIG. 9a shows that the real-time PDF is closer to reference PDF [950] than to reference PDF [952] and therefore the decision may be that the wireless device is in location "A". Conversely, in FIG. 9b the real-time PDF is closer to reference PDF [952] than to reference PDF [950] hence the decision may be that the wireless device is in location "B".

Figure 10A:
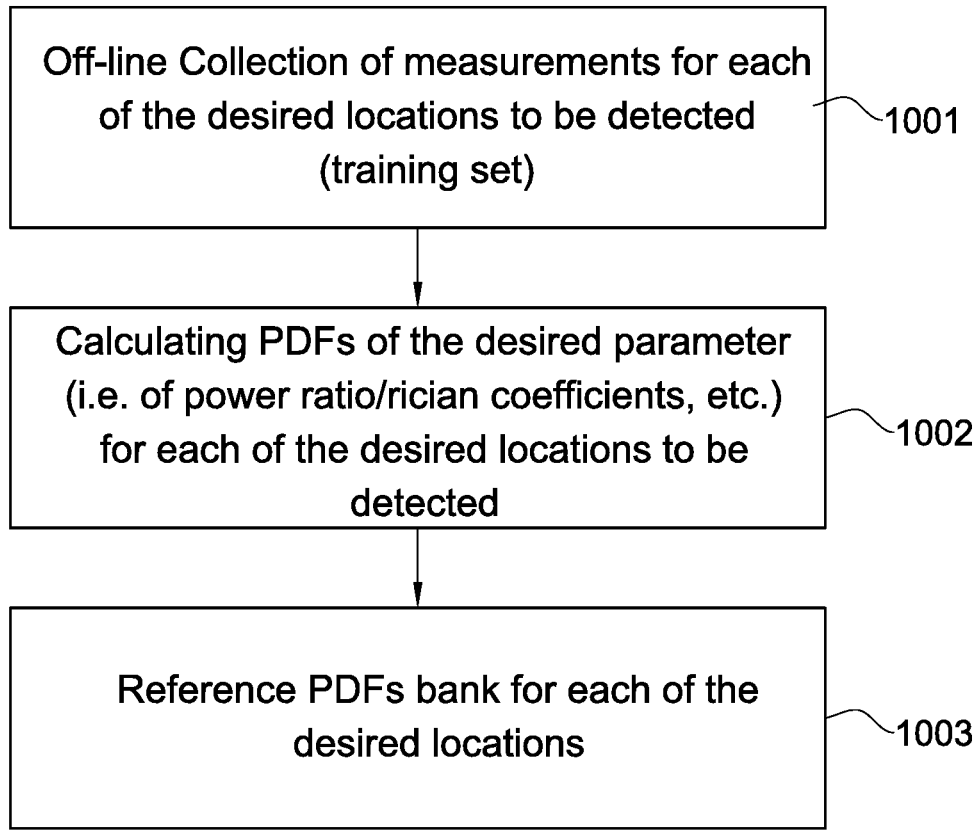
FIGS. 10a-10c are simplified flowchart illustrations of a cellphone localization process, in accordance with certain embodiments.
Figure 10B:
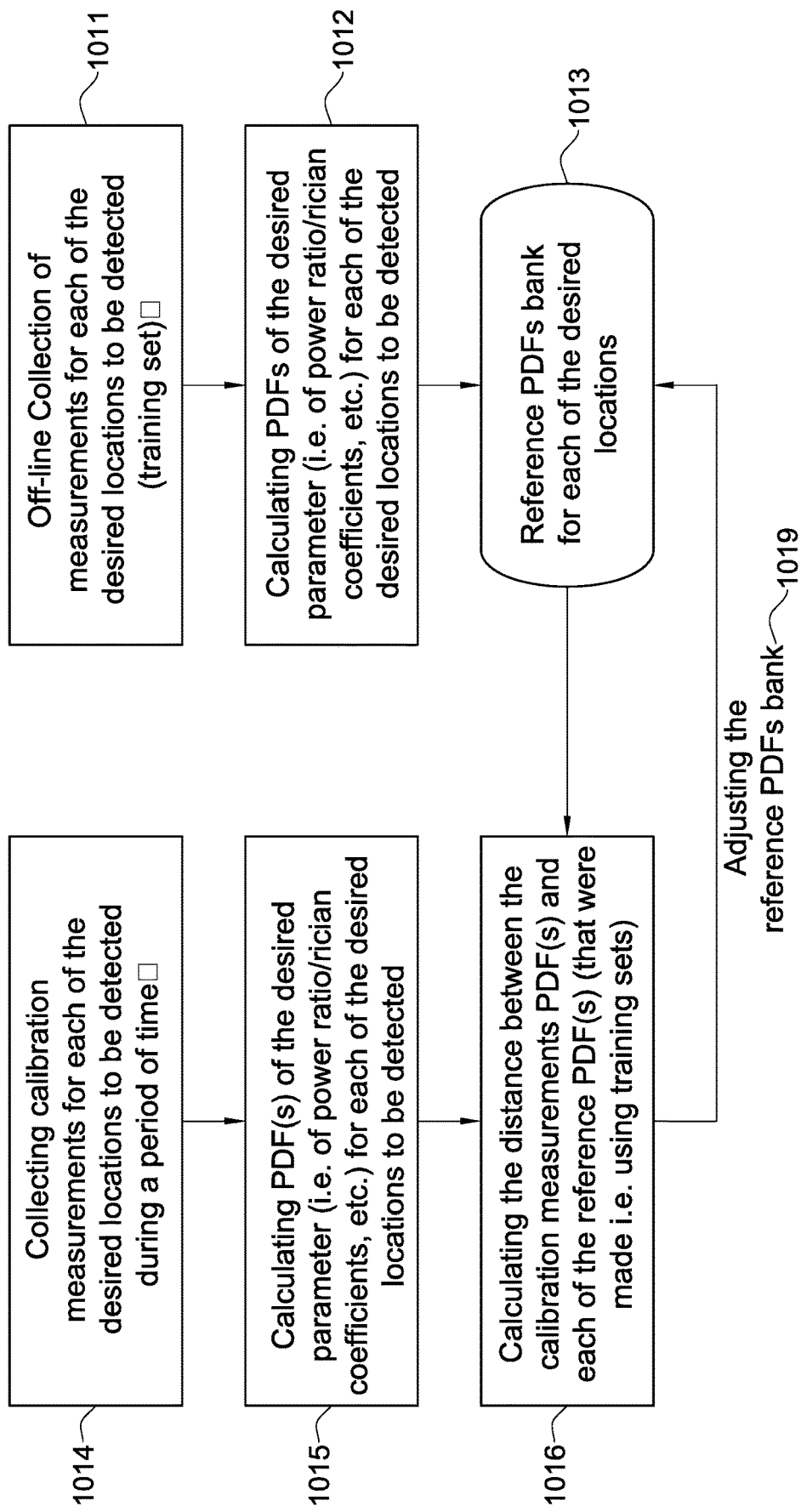
Figure 10C:
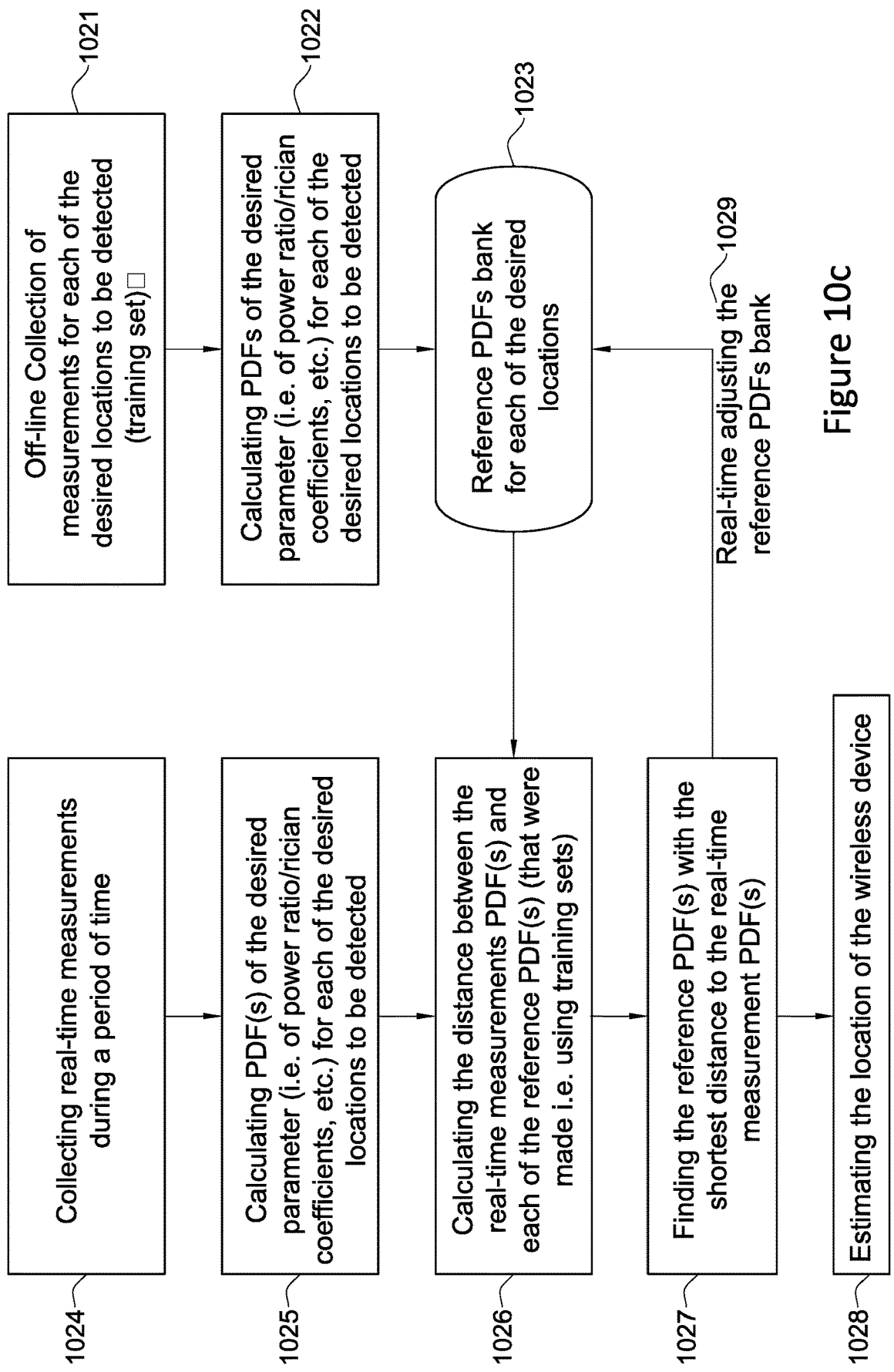

A wireless device (e.g. cellphone) localization process is now described with reference to FIGS. 10a-10c. The localization process includes some or all of, in any suitable order e.g. as shown:

creating a reference PDFs bank e.g. as shown in FIG. 10a,
initial calibration in a new volume type e.g. as shown in FIG. 10b, and
real-time localization of the wireless device/cellphone e.g. as shown in FIG. 10c.

Turning now to FIG. 10a, the reference PDF bank generation process typically includes some or all of the following operations, suitably ordered e.g. as shown:

Operation 1001: Off-line collection of measurements (samples) when the transmitting/radiating device e.g. smartphone is positioned in each of several locations within a volume (training set)

Operation 1002: determine desired parameter/quality of reception/RSSI, compute PDFs of the desired parameter (e.g. power ratio/Rician coefficients, etc.) for each of the locations or each of several pairs of locations Operation 1003: store as Reference PDFs—one per each of the locations The calibration within new volume process of FIG. 10b typically includes some or all of the following operations, suitably ordered e.g. as shown:

Operation 1011: Off-line collection of measurements for each of the desired locations to be detected (training set). This operation may be similar to operation 1001 of FIG. 10a.

Example: a set of example locations at which a transmitting/radiating device such as smartphone may be positioned, when training a system according to certain embodiments of the present invention, may include locations in which the driver's cellphone is likely to be deployed (e.g. when held by the driver), and/or locations in which the passenger's cellphone is likely to be deployed (e.g. when held by the passenger), for example, respectively, some or all of the following:

Some or all of the following 6 habitual locations in the Driver's area or vicinity or quadrant:
1—on the dashboard
2—held by the driver in front of the chest
3—held by the driver, close to his right knee
4—held by the driver left of the steering wheel
5—held by the driver above the steering wheel
6—held by the driver, on the middle of the steering wheel.

It is appreciated that "quadrant" is used herein not to refer to region occupying exactly 25% of the vehicle interior but instead to include or consist of a region within the total vehicular interior including the driver's seat and the portion of the interior in front of the driver's seat; similarly a passenger's quadrant may include or consist of a region within the total vehicular interior including the passenger's seat and the portion of the interior in front of her or his seat.

Some or all of the following 6 habitual locations in the front seat passenger's area or quadrant:
1—held by the passenger, close to his right ear
2—held by the passenger in front of the chest
3—held by the passenger, close to his left ear
4—held by the passenger, close to his right knee
5—on the dashboard in front of the passenger
6—held by the passenger, close to his left knee Operation 1012: Computing PDFs of the desired parameter (i.e. of power ratio/Rician coefficients, etc.) for each of the desired locations to be detected (this operation may be similar to operation 1002 of FIG. 10a.) and store in Reference PDFs bank 1013 for each of the desired locations.

Operation 1014: Collecting calibration measurements for each of the desired locations to be detected during a period of time e.g. a period of some seconds or minutes.

Operation 1015: Computing PDF or PDFs of the desired parameter (e.g. of power ratio/Rician coefficients, etc.) for each of the desired locations to be detected Operation 1016: using the data stored in operation 1012, compute the distance between the calibration measurements PDF(s) and each of the reference PDF(s) generated using training sets)

Operation 1019: using the distance (or distances) computed at operation 1016, adjusting the PDF(s) of the Reference PDFs bank 1013. An example of such adjustment can be e.g. by replacing the PDF in the Reference PDF bank closest to the PDF computed in operation 1015, with the PDF computed in operation 1015. Another example of adjustment may include replacing the PDF of the Reference PDF bank less than fully e.g. replacing the PDF stored in the Reference PDF bank with a linear or other combination of:
the closest PDF from the reference bank; and
the PDF computed in operation 1015.

The real-time localization process of FIG. 10c typically includes some or all of the following operations, suitably ordered e.g. as shown:

Operation 1021: Off-line collection of measurements for each of the desired locations to be detected (training set) E.g. similar to operation 1001 of FIG. 10a.

Operation 1022: Computing PDFs of the desired parameter (i.e. of power ratio/Rician coefficients, etc.) for each of the desired locations to be detected e.g. similar to operation 1002 of FIG. 10a and storing in Reference PDFs bank 1023 for each of the desired locations.

Operation 1024: Collecting real-time measurements during a period of time

Operation 1025: Computing PDFs of the desired parameter (i.e. of power ratio/Rician coefficients, etc.) for each of the desired locations to be detected Operation 1026: Computing the distance between the real-time measurements PDF(s) and each of the reference PDF(s) (that were made i.e. using training sets)

Operation 1027: Finding the reference PDF(s) with the shortest distance to the real-time measurement PDF(s) and Real-time adjusting the reference PDF bank 1023

Operation 1028: use the result of operation 1027 for estimating the location of the wireless device e.g. by determining the current location as the location whose PDF is closest to the real-time PDF.

Operation 1039: using the distance (or distances) computed at operation 1026 or the reference PDF with the shortest distance to the real-time measurement PDF(s) at operation 1027, adjusting, in real-time, the PDF(s) of the Reference PDFs bank 1023. Adjustment may for example include replacing the PDF in the Reference PDFs bank closest to the real-time PDF of operation 1025 with the real-time PDF of operation 1015. Furthermore, rather than fully replacing the PDF of the Reference PDFs bank, adjustment may include replacing the PDF of the Reference PDFs bank with a combination (e.g. linear) of the closest PDF from the reference bank and the real-time PDF of operation 1025.

It is appreciated that distance computations between PDFs may be made according to various criteria, such as but not limited to:
Data Hard—conventional ("basic") algorithm with hard decision—aka MLHD
PDF L2—measuring distances between PDF's by a second norm described herein, Norm 2—aka L2 or L2 criterion
PDF L1—measuring distances between PDF's by a first norm described herein, Norm 1—aka L1 or "L1" criterion
Smirnof—measuring the maximal distances between CDF's.
PDF Weighted—weighted distances between PDF's—aka "weighted L2"
DF Correlation—measuring correlation between PDF's—aka "correlative"
Data Soft—conventional ("basic") algorithm with soft decision—aka MLSD
Rank—PDF's of 24 combinations when sorting the 4 antennae by power e.g. as described herein.

Definitions $x=\{x(t_i)\}$—is a four-dimensional vector of the normalized samples of sensors (e.g. antenna/c) power obtained during "training" stage for the case of the cell phone in the driver's area.

$f_x(x)$—is a four-dimensional PDF histogram with cumulative histogram $F_x(x)$.

$y=\{y(t_i)\}$—is a four-dimensional vector of the normalized samples of sensors (e.g. antenna/e) power obtained during the "training" stage in the case of a cell phone in the passenger's area.

$f_y(y)$—is a four-dimensional PDF histogram with cumulative histogram $F_y(y)$ $m=\{m(t_i)\}$—is a four-dimensional vector of the normalized samples of sensors (e.g. antenna/e) power obtained during real-time measurements.

$\tilde{f}_m(m)$—is a four-dimensional histogram with cumulative histogram $\tilde{F}_m(m)$ Suppose that length of the vector m is significantly less than length of training vectors x and y, so $\tilde{f}_m(m)$ is less exact then $f_x(x)$ and $f_y(y)$). In [3]

influence of the length of vector m was considered as the most important parameter of different SCU algorithms quality.

Given: ={x(t_i)}, y={y(t_i)}, m={(t_i)}.

SCU [202] in FIG. 2 is configured to determine whether the distance (which is to be defined) between $\tilde{f}_m(m)$ and $f_x(x)$ (or between $\tilde{F}_m(m)$ and $F_x(x)$) exceeds (or does not exceed) the distance between $\tilde{f}_m(m)$ and $f_y(y)$ (or between $\tilde{F}_m(m)$ and $F_y(y)$). Each of the above criteria's sensitivity to length of vector m={m(t_i)} may be estimated, as may be their sensitivity to resolution of observations' quantization.

Two kinds of errors are considered: False Alarm (FA) and Missed Signal (MS). Deem a process to be convergent if the error probabilities Pr(FA)=Pr(SCU: "Yes"/Passenger's cell phone)

and

Pr(MS)=Pr(SCU: "No"/Driver's cell phone)

are lower than the required threshold (for example 0.05). In the following inequality:

$$\sum_{i=1}^{N} \delta_{xm} \overset{<D}{\underset{>P}{}} \sum_{i=1}^{N} \delta_{ym}$$

(decision "Yes" or decision "No"), distance δ between values of PDFs or CDFs points at certain quantization regions of the four dimensional normalized observations power space is defined in a given manner as set out below.

Using "L2" criterion, $$\delta_{xmi} = \sum_{k=1}^{4} (x_{ik} - m_{ik})^2, \quad \delta_{ymi} = \sum_{k=1}^{4} (x_{ik} - m_{ik})^2$$

Using "L1" criterion, $$\delta_{xmi} = \sum_{k=1}^{4} |x_{ik} - m_{ik}|, \quad \delta_{ymi} = \sum_{k=1}^{4} |y_{ik} - m_{ik}|$$

Using "Smirnoff" criterion, $$\max_i |F(x) - F(m)| \overset{<D}{\underset{>P}{}} \max_i |F(y) - F(m)|$$

Using Weighted L2 criterion, $$\delta_{xmi} = \sum_{k=1}^{4} f_{mik}(x_{ik} - m_{ik})^2, \quad \delta_{ymi} = \sum_{k=1}^{4} f_{mik}(y_{ik} - m_{ik})^2$$

Using "Correlative" criterion, $$\delta_{xmi} = \frac{\sum_{k=1}^{4} m_{ik} x_{ik}}{\sqrt{\sum_{k=1}^{4}\sum_{i=1}^{N} m_{ik}^2} \sqrt{\sum_{k=1}^{4}\sum_{i=1}^{N} x_{ik}^2}},$$

$$\delta_{ymi} = \frac{\sum_{k=1}^{4} m_{ik} y_{ik}}{\sqrt{\sum_{k=1}^{4}\sum_{i=1}^{N} m_{ik}^2} \sqrt{\sum_{k=1}^{4}\sum_{i=1}^{N} y_{ik}^2}}$$

Using "Max. likelihood-soft decision"="MLSD" criterion, $$\delta_{xmi} = \sum_{k=1}^{4} (x_{ik} - m_{ik}), \quad \delta_{ymi} = \sum_{k=1}^{4} (y_{ik} - m_{ik})$$

Using "Max. likelihood-hard decision"="MLHD" criterion, $$\delta_{xmi} = \sum_{k=1}^{4} \text{sign}(x_{ik} - m_{ik}), \quad \delta_{ymi} = \sum_{k=1}^{4} \text{sign}(y_{ik} - m_{ik})$$

Performance of the various criteria e.g. as illustrated above, depends on compatibility of training and measurement vectors which may or may not practically speaking exist. Also, training data, as well as the observation results, are usually neither stationary nor ergodic, so averaging them may suffer from considerable deviation.

A so-called rank criterion, less sensitive to all these factors, may be employed. Due to certain localizations of antennae inside a car, their distances to the driver $d_d=(d_{1d}, d_{2d}, d_{3c}, d_{4c})$ and to the passenger $d_p=(d_{1p}, d_{2p}, d_{3p}, d_{4p})$ may be estimated. Assume signals received by antennae have a Rice PDF with certain values of line-of-sight factor forming vector of Rician K-factors $K=(K_1, K_2, K_3, K_4)$ depending on $d_d$ and $d_p$ and the strength of a multipath Raileigh distributed component.

The pdf, expressed in terms of the local-mean power $\overline{P}$ and the Rician K-factor, is:

$$f_s(s) = (1+K)\exp\left(-K - \frac{1+K}{2\overline{P}}s^2\right)\frac{s}{\overline{P}} I_0\left(\sqrt{\frac{2K(1+K)}{\overline{P}}} s\right).$$

The pdf of signal power P may be derived from the PDF of signal amplitude s. For example, given $$P = \frac{s^2}{2}:$$

$$f_P(P) = \frac{1+K}{\overline{P}}\exp\left(-K - \frac{1+K}{\overline{P}}P\right) I_0\left(\sqrt{4K(1+K)}\frac{P}{\overline{P}}\right).$$

Assume vectors $d_d=(d_{1d}, d_{2d}, d_{3d}, d_{4d})$ and $d_p=(d_{1p}, d_{2p}, d_{3p}, d_{4p})$ to be ordered such that $d_{1d}<d_{2d}<d_{3d}<d_{4d}$ and $d_{1p}<d_{2p}<d_{3p}<d_{4p}$—in which case $K_1>K_2>K_3>K_4$. Then in the case of the training sequence x or y after averaging and normalizing of four antennae powers one of the following inequalities $P_i>P_j>P_k>P_l$ may hold, where $i,j,k,l \in [1 \div 4]$. If training "driver" and "passenger" training sequence are of sufficient length, then, most frequently, inequalities $P_1>P_2>P_3>P_4$ and $P_4>P_3>P_2>P_1$ may hold hence these inequalities may be said to be "typical sequences". Other sequences typically occur with lower probability, but they may be separated into two groups: those "closer" to, and those "more distant from", $P_1>P_2>P_3>P_4$ or $P_4>P_3>P_2>P_1$. Probability of all sequences (inequalities) may be computed in advance. Decision-making in real time may then comprise:

If the observed sequence $P_i>P_j>P_k>P_l$ relates to the group of sequences closer to $P_1>P_2>P_3>P_4$, then the decision is "Driver".

If the observed sequence $P_i>P_j>P_k>P_l$ relates to the group of sequences closer to $P_4>P_3>P_2>P_1$, then the decision is "Passenger".

"False Alarm" corresponds to the case that the vector of measurements m yields one of the sequences from the first group whereas in fact, the cell phone is in a Passenger quadrant. A "Missed Signal" event occurs when m yields one of the sequences from the second group whereas in fact, the cell phone is in the driver's quadrant OR vicinity.

The number of different sequences in this case is 4!=24 and each of the first and second groups includes 12 sequences. If a fifth antenna is added, there may be 60 sequences in both groups which would decrease type 1 and type 2 errors. If all antennae have given deployments inside the car, the set of the corresponding power preference combinations may not depend on random changes in the electromagnetic environment during training or measurement stages, nor on the type of antennae, should this change.

The method described herein may use "main" antennae to locate the wireless device and at least one "reference" antenna. The system typically handles the changes of the wireless device power by adjusting the received power of the main antennae as opposed or relative to the received power of the reference antennae (e.g. if the power of the reference antenna decreases by x dB then the power of all the main antennae may be increased by x dB).

Figure 11:
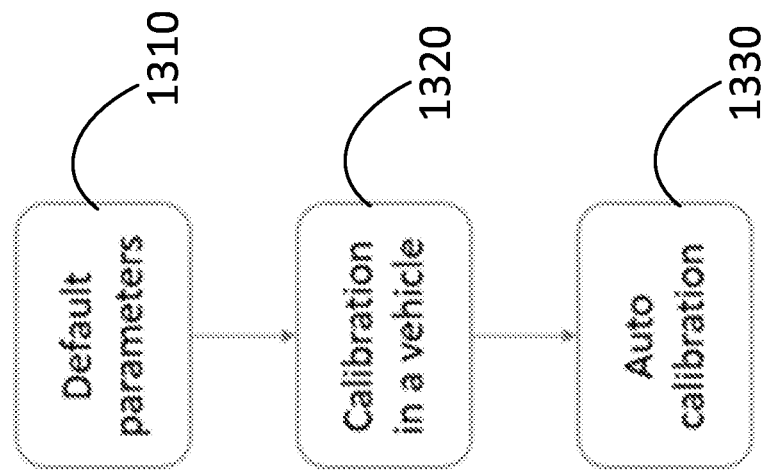
FIG. 11 is a simplified flowchart illustration of three calibration methods any or all of which may for example be utilized in conjunction with the detailed localization process of FIGS. 10a-10c.

FIG. 11 is a simplified flowchart illustration of three calibration methods any or all of which may for example be utilized in conjunction with the detailed localization process of FIGS. 10a-10c. The first method [1310] is based on default parameters which may be computed based on measurements taken from several vehicles during a set-up development process. The second method [1320] is based on a calibration process performed for a specific vehicle on which the system shown and described herein has been installed. Calibration for the above two methods may include locating the wireless device in known positions and collecting the data from all antennae, typically for a few minutes or even less. The third method [1330] is based on an online collection method that may continuously collect the data from the antennae and updates the calibration parameters.

Locating a wireless device within a general volume as described herein may be integrated with many applications and use-cases. For example, indoor location of cellular mobile phones may be used for indoor navigation, or for many location-based services. In addition, locating of wireless devices may be used also for safety and security purposes, such as prohibiting the use of peripherals of the phones at predefined locations or disabling hardware or software functionalities (e.g. applications) when these may endanger the user.

The terms "wireless device", "cellphone", "smartphone", "radiating device" "mobile (communication) device", "transmitting device" and similar, as used herein are intended to include but not be limited to any of the following: mobile telephone, smart phone, playstation, iPad, TV, remote desktop computer, game console, tablet, mobile e.g. laptop or other computer terminal, embedded remote unit.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order: any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may if desired be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones, may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, be able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A system for localizing a transmitting wireless device within a known volume, the system comprising:
    N>=2 antennae deployed in N>=2 respective locations at least some of which are located within the known volume, each of the antennae being operative to receive and output a signal from the transmitting wireless device;
    at least one analog-to-digital converter operative to convert analog received signals at the output of the antennae to digital sampled received signals; and
    a processor operative:
    to receive said digital sampled received signals and to compute at least one real time output parameter comprising a function of:
        digitally sampled received signals S, received from the transmitting wireless device at antenna i; and of
        digitally sampled signals, received from the transmitting wireless device at antenna j and digitally sampled, simultaneously with reception at antenna I and digital sampling of said digitally sampled received signals S,
    which function is independent of a power level at which the transmitting device is transmitting,
    and to estimate the transmitting wireless device's location within the volume by comparing said at least one real time output parameter to plural reference output parameters respectively having a known correspondence to plural known possible locations within said volume respectively, for at least one pair of antennae i, j from among said N antennae,
    wherein said function comprises a probability density function, over time/frequency, of a parameter of
    quality of reception of transmission from the transmitting wireless device at antenna I; and
    simultaneous quality of reception of transmission from the transmitting wireless device at antenna j.

2. A system according to claim 1, wherein said function comprises a ratio between
    quality of reception of transmission from the transmitting wireless device at antenna I; and
    simultaneous quality of reception of transmission from the transmitting wireless device at antenna j.

3. A system according to claim 2, wherein said comparing comprises computing plural distances between said at least one real time output and each of said plural reference outputs respectively.

4. A system according to claim 3, wherein at least one of said distances is computed using least squares technology.

5. A system according to claim 3, wherein at least one of said distances is computed by integrating a maximum function of said outputs.

6. A system according to claim 1, wherein said quality of reception comprises a power level measurement.

7. A system according to claim 6, wherein said power level measurement comprises an RSSI value.

8. A system according to claim 1, wherein said transmitting wireless device comprises a cellular device transmitting to a base station other than the N antennae.

9. A system according to claim 1, wherein said known volume is within a vehicle and said antennae are deployed on board the vehicle.

10. A system according to claim 9, wherein the vehicle has an interior defining 4 corners and said antennae are deployed at least at said 4 corners.

11. A system according to claim 9, wherein the vehicle has an interior defining 4 corners and said antennae are deployed at least at some of 4 corners.

12. A system according to claim 9, wherein the transmitting device is transmitting to a stationary base station external to the vehicle which is moving.

13. A system according to claim 1, wherein said plural reference outputs are each previously learned by computing an output being said function of:
   quality of reception of radiation at antenna i, from a transmitting device deployed at a known location within said volume; and of
   simultaneous quality of reception of radiation from the transmitting device at antenna j from the transmitting device deployed at the known location.

14. A system according to claim 1, wherein said location is estimated by finding plural weights which minimize distance between:
   weighted combinations, based on said weights, of the plural reference outputs, and between
   the real time output,
   and computing a location which is a weighted combination of said plural locations, using said plural weights which minimize distance.

15. A system according to claim 1, wherein said at least one pair of antennae comprises multiple pairs.

16. A system according to claim 15, wherein the transmitting device is to be localized within a sub-region inside the volume, and wherein said antennae includes at least first and second antennae ("main antennae") deployed within said sub-region and at least one ("reference") antenna deployed externally to said sub-region and wherein said multiple pairs of antennae each include one of the antennae within the sub-region and one of the antennae deployed externally to said sub-region.

17. A system according to claim 15, wherein said known volume is within a vehicle and said sub-region comprises a quadrant of the vehicle including the driver's seat.

18. A system according to claim 17, wherein the system also comprises a computerized service provider configured to selectably provide at least one service unsuitable for an end-user who is driving, depending on whether or not the transmitting device is located within the quadrant of the vehicle including the driver's seat.

19. A system according to claim 15, wherein said function comprises a multi-dimensional probability density function of multiple functions each of said multiple functions relating quality of reception of radiation from the transmitting device at antenna i; to simultaneous quality of reception of radiation from the transmitting device at antenna j, for a different pair from among said multiple pairs (i, j) respectively.

20. A computer program product, comprising a non-transitory tangible computer readable medium having computer readable program code embodied therein, said computer readable program code adapted to be executed to implement a method for localizing a transmitting wireless device within a known volume, the method being practiced in conjunction with N>=2 antennae deployed in N>=2 respective locations at least some of which are located within the known volume, each of the antennae being operative to receive and output a signal from the transmitting wireless device and with at least one analog-to-digital converter operative to convert analog received signals at the output of the antennae to digital sampled received signals, the method comprising:
   using a processor to receive said digital sampled received signals and to compute at least one real time output parameter comprising a function of:
   digitally sampled received signals S, received from the transmitting wireless device at antenna i; and of
   digitally sampled signals, received from the transmitting wireless device at antenna j and digitally sampled, simultaneously with reception at antenna I and digital sampling of said digitally sampled received signals S, which function is independent of a power level at which the transmitting device is transmitting,
   using a processor to estimate the transmitting wireless device's location within the volume by comparing said at least one real time output parameter to plural reference output parameters respectively having a known correspondence to plural known possible locations within said volume respectively,
   for at least one pair of antennae i, j from among said N antennae
   wherein said function comprises a probability density function, over time/frequency, of a parameter of quality of reception of transmission from the transmitting wireless device at antenna I; and
   simultaneous quality of reception of transmission from the transmitting wireless device at antenna j.

21. A computer program product according to claim 20, wherein said function comprises a ratio between
   quality of reception of transmission from the transmitting wireless device at antenna I; and
   simultaneous quality of reception of transmission from the transmitting wireless device at antenna j.

22. A method for localizing a transmitting wireless device within a known volume, the method comprising:
   providing N>=2 antennae deployed in N>=2 respective locations at least some of which are located within the known volume, each of the antennae being operative to receive and output a signal from the transmitting wireless device and at least one analog-to-digital converter operative to convert analog received signals at the output of the antennae to digital sampled received signals; and
   using a processor to receive said digital sampled received signals and to compute at least one real time output parameter comprising a function of:
   digitally sampled received signals S, received from the transmitting wireless device at antenna i; and of
   digitally sampled signals, received from the transmitting wireless device at antenna j and digitally sampled, simultaneously with reception at antenna I and digital sampling of said digitally sampled received signals S, which function is independent of a power level at which the transmitting device is transmitting,
   and to estimate the transmitting wireless device's location within the volume by comparing said at least one real time output parameter to plural reference output parameters respectively having a known correspondence to plural known possible locations within said volume respectively, for at least one pair of antennae i, j from among said N antennae wherein said function comprises a probability density function, over time/frequency, of a parameter of quality of reception of transmission from the transmitting wireless device at antenna I; and simultaneous quality of reception of transmission from the transmitting wireless device at antenna j.

23. A method according to claim 22, wherein said function comprises a ratio between quality of reception of transmission from the transmitting wireless device at antenna I; and simultaneous quality of reception of transmission from the transmitting wireless device at antenna j.

* * * * *